March 29, 1955  H. P. LEWIS  2,705,017
COUNTERBALANCED FLUID-RELAY MECHANISM
Filed Oct. 30, 1948

INVENTOR.
HENRY P. LEWIS
BY
Raymond L. Jenkins
ATTORNEY

United States Patent Office 2,705,017
Patented Mar. 29, 1955

2,705,017

COUNTERBALANCED FLUID-RELAY MECHANISM

Henry P. Lewis, Cleveland, Ohio, assignor to Bailey Meter Company, a corporation of Delaware Application October 30, 1948, Serial No. 57,467

13 Claims. (Cl. 137—86)

This invention relates to relay mechanisms, and more particularly to relay mechanisms adapted especially for use in systems operating to maintain a condition at a predetermined value.

In the Gorrie Patent Re. 21,804 there is shown in Fig. 1 a control system operating in response to changes in a condition for regulating the flow of fluid so as to maintain the condition at some predetermined value. Included in the system is a standardizing relay which is balanced when the condition is at the desired value, and which operates when balanced to supply a constant pressure to a valve means regulating the flow of fluid affecting the condition. If the condition varies from the desired value in one direction, the relay is unbalanced to supply a continuously increasing pressure to the valve means for positioning the latter in a direction to effect a return of the condition to the desired value. A variation of the condition in the opposite direction from the desired value causes the relay to become unbalanced and decrease the pressure continuously for positioning the valve means to return the condition to the desired value. As shown in the Gorrie patent the valve means is opened by an increasing pressure, and a drop in the condition below the desired value causes the relay to become unbalanced so as to increase continuously the pressure supplied to the valve means. If the pressure is increased until the valve is fully open and the condition still has not returned to the desired value, the relay continues to increase the pressure supplied to the valve means. When the condition eventually returns to the desired value, the relay is balanced and holds the pressure on the valve means at the maximum value reached. If the condition now goes above the desired value the relay is unbalanced to reduce the pressure, but the valve means does not move toward its closed position immediately because time is required to get rid of the excess pressure holding the valve open. A similar situation exists when the pressure on the valve means is reduced after the valve is fully closed. If the pressure supplied to the valve is below the value at which the valve is fully closed, then a drop in the condition may unbalance the relay to increase the pressure but the valve will not start to open until some increase in the pressure has taken place. If the rate of pressure change is slow, an appreciable period of time may elapse before the position of the valve is changed. To hold the condition close to the desired value, it is necessary that the valve means be positioned immediately after the condition varies from the desired value.

An object of my invention is to provide an improved relay mechanism. Another object is to provide a relay mechanism which is operative on unbalance to supply a pressure which varies in value within predetermined limits in one direction or the other depending upon the direction of unbalance. Still another object is to provide an improved relay mechanism which is operative on unbalance to supply a pressure varying in value in one direction up to a maximum value if the unbalance is continued long enough, and which is operative on an unbalance in the opposite direction, if the maximum value has been reached, to supply the pressure at a predetermined value under the maximum and varying from that value in the opposite direction. Yet another object is to provide a relay mechanism which is adjustable to vary pressure within desired limits.

In the accompanying drawing there are shown for purposes of illustration several forms which my invention may assume in practice.

Figure 1:
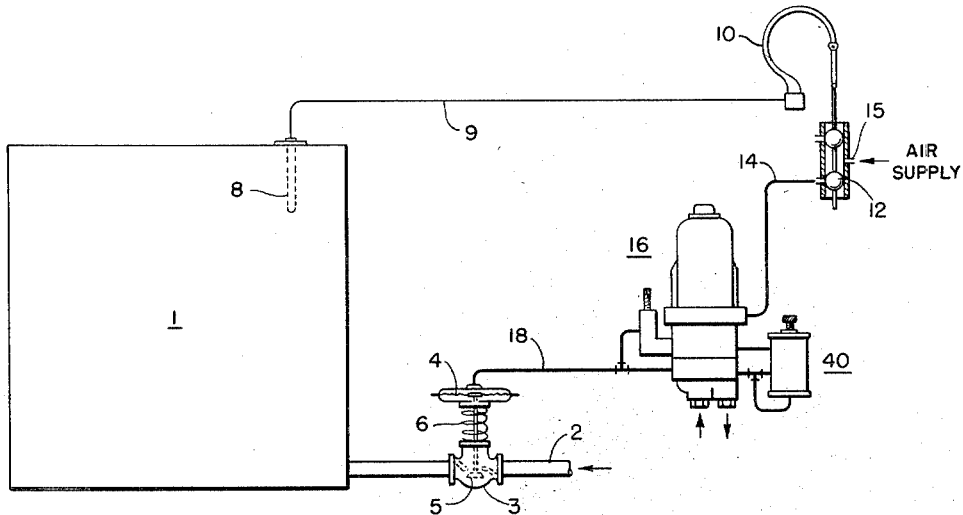
Fig. 1 is a schematic diagram of a control system having my improved relay mechanism incorporated therein.

Referring to Fig. 1 it will be noted that there is shown a system which operates to maintain a predetermined temperature within a tank 1 by regulating the flow of a heating medium, such as steam, through a conduit 2 to the tank. A valve 3 is arranged in the conduit 2 and is actuated by a pressure fluid motor 4 for regulating the flow of steam. As shown, the pressure fluid motor is effective for positioning a valve member 5 in an opening direction against the action of a spring 6 as the pressure supplied to the motor 4 increases.

Disposed in the tank 1 is a temperature sensitive device 8 connected by a conduit 9 to a Bourdon tube 10 for actuating the latter in accordance with changes in temperature. Connected to the Bourdon tube is a pilot valve 12 for regulating communication of a conduit 14 with a pressure fluid supply 15 and the atmosphere. The pressure in the conduit 14 is applied to a standardizing or pressure balancing relay 16 for establishing a control pressure which is transmitted through a conduit 18 to the motor 4. The arrangement is such that an increase of the temperature within the tank causes the pilot valve to operate so as to decrease proportionately the pressure supplied to the relay 16 for effecting an operation of the latter to decrease the pressure supplied to the motor 4. The valve member 5 is then moved by the spring 6 toward its closed position to decrease the rate of steam flow to the tank. A drop in the temperature results in an operation of the relay to increase the pressure supplied to the motor 4 for opening the valve. The pilot valve 12 is disclosed in the Johnson patent 2,054,464 and need not be described in detail herein.

Figure 2:
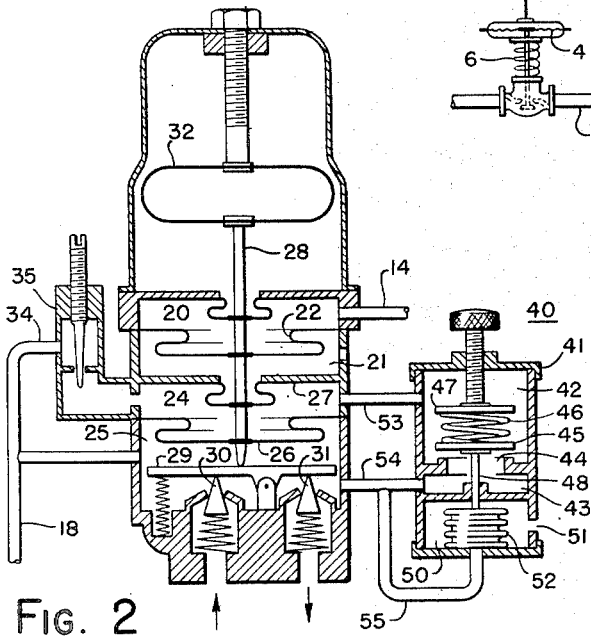
Fig. 2 is an enlarged sectional view of my improved relay mechanism.

The relay 16 comprises, as shown in Fig. 2, a casing having a pair of chambers 20, 21 separated by a flexible partition 22, and another pair of chambers 24, 25 separated by a flexible partition 26. Arranged between the pair of chambers is a stationary partition 27. Extending longitudinally through the casing is an elongated member 28 connected to the flexible partitions 22, 26 and adapted to act at its lower end on a pivoted beam 29 which controls the positions of an intake valve 30 and a discharge valve 31. An adjustable spring 32 is connected to the upper end of the member 28 for opposing its movement toward the pivoted beam 29. The chambers 24 and 25 are connected in restricted communication by a conduit 34 and a restricting valve 35. The conduit 14 delivers pressure to the chamber 20, and the conduit 18 receives pressure from the chamber 25.

The control system including the relay so far described is similar to that disclosed in the above mentioned Gorrie patent and its operation to regulate the valve 3 is as follows. The relay spring 32 is adjusted so that it balances the pressure supplied to the chamber 20 when the temperature in the tank is at the value it is desired to maintain. With the pressure in chamber 20 balanced by the spring, the pressures in the chambers 24 and 25 balance each other through the conduit 34 and the restricting valve 35. The pivoted beam at this time assumes a neutral position to permit the valves 30, 31 to close, and the pressure in the conduit 18 is maintained at the value existing in the chamber 25. If the temperature now drops below the desired value, the pressure supplied to the chamber 20 from the pilot valve is increased, and this pressure acting on the partition 22 forces the member 28 downwardly against the action of the spring. The pivoted beam is operated by the member 28 to open the supply valve 30 until the pressure beneath the partition 26 increases to a value balancing the pressure in the chamber 20. This means that the pressure in chamber 25 now exceeds the pressure in the chamber 24, and fluid flows through the conduit 34 and the restricting valve 35 to the chamber 24. As the pressure at the upper side of the partition 26 increases, the relay becomes unbalanced again to open the valve 30 and increase further the pressure in the chamber 25. As long as the pressure in the chamber 20 remains at a value high enough to overcome the action of the spring 32 the pressure in the chamber 25 continues to increase, and this pressure is supplied to the motor for opening the valve 5. There may be times when the valve 5 is fully opened and the temperature still remains below the desired value. At such times the relay would continue to increase the pressure supplied to the motor 4 but it would have no effect on the flow of steam to the tank 1. If the temperature now increases to some value above that desired, the pressure in the chamber 20 is reduced to a point where the spring moves the member 28 upwardly to open the exhaust valve 31 until the pressure in the chamber 25 drops to a value rebalancing the relay. The pressure in the chamber 24 is now higher than that in chamber 25 and fluid flows through the restricted passage means to the chamber 25, effecting an unbalance of the relay again to unseat the exhaust valve 31 for reducing further the pressure in the chamber 25. It will be seen that the pressure in the chamber 25 continues to fall off as long as the pressure in the chamber 20 is low. The pressure acting on the motor 4 is reduced with the pressure in the chamber 25, but the valve 5 will not move toward its closed position until the excess pressure supplied to the motor 4 after the valve had been fully opened, is removed. If the communication between the chambers 24 and 25 is greatly restricted, the rate of pressure change in the chamber 25 is low, and the valve 5 may be held in its full open position when the temperature in the tank is calling for a closing of the valve.

In order that the valve 5 may have its position changed immediately with a change in the temperature from a low to a high value, I have provided a valve mechanism 40 for by-passing the chambers 24, 25 when the pressure in the chamber 25 reaches a value sufficient to position the valve 5 in its full open position. This valve mechanism comprises a casing 41 having valve chambers 42 and 43 adapted to communicate with each other through a port 44 controlled by a valve 45. A spring 46 acts between an adjustable abutment 47 and the valve 45 for urging the latter toward its closed position. A valve stem 48 extends through the chamber 43 to a separate external chamber 50 communicating with the atmosphere through a port 51, and the valve stem is positively connected to one end of a bellows 52 which is supported at its other end by the casing. The chamber 42 is connected to the relay chamber 24 by a conduit 53 while the chamber 43 and the interior of the bellows 52 are connected in communication with the relay chamber 25 by conduits 54 and 55.

The abutment for the spring 46 is adjusted so that the valve 45 is held closed until the pressure in the relay chamber 25 increases to a value at which the valve 5 is just moved to its full open position. When this pressure is reached, the bellows 52 expands and unseats the valve 45 to connect the chambers 24 and 25 in free communication with each other. With these chambers in free communication and the relay unbalanced to open the valve 30, the pressure increases in the chamber 25 to rebalance the relay but it also increases in the chamber 24 at the same rate to prevent rebalancing. The pressure therefore increases rapidly in chamber 25 until it reaches the maximum supply pressure. Since this pressure acts on the bellows 52, the valve 45 is moved quickly to its full open position if it was not moved there when first unseated. The pressure in the chamber 25 may now be much higher than is needed to hold the valve 5 in its full open position. As soon as the temperature in the tank increases to a value which unbalances the relay in the opposite direction, the exhaust valve 31 is opened to reduce the pressure in the chamber 25 in an attempt to effect a rebalance. The chambers 24 and 25 are still in free communication, however, so that the pressure in the chamber 24 drops at the same rate and prevents a rebalancing. The pressure in the chamber 25 therefore drops at a rapid rate until it reaches the value at which the valve 45 is again seated. From this point on the chambers 24 and 25 are connected only through the restricting valve 35 and the conduit 34, and the pressure drops at a gradual rate as long as the relay is unbalanced by reason of the excessive temperature. The valve 5 is barely held in its full open position by the pressure existing when the valve 45 closes, and the gradual reduction in pressure effects immediately closing movement of the valve 5.

Figure 3:
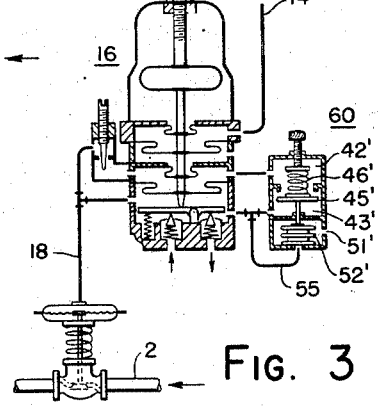

It will be appreciated that there may be times when the valve 5 is fully closed and the temperature in the tank is still too high. At such times the pressure supplied to the motor 4 would be reduced lower than need be and there would not be an immediate positioning of the valve when the temperature became too low unless some by-pass valve mechanism was provided. In Fig. 3 I have shown a by-pass valve mechanism 60 like that of Fig. 1 except that the valve 45' is urged by the bellows 52' toward its seat against the action of the spring 46'. When the relay is unbalanced and decreases the pressure in the conduit 18 to the point where the valve 5 is seated, this same pressure acting on the bellows 52' is insufficient to hold the valve 45' closed. The chambers 24 and 25 of the relay are then connected in free communication so that it operates to reduce the pressure in conduit 18 rapidly to atmospheric. As soon as the temperature drops to a value at which the relay is unbalanced in the opposite direction, the pressure in the conduit 18 is rapidly increased to the point where the valve 5 is barely held closed. This pressure acts to expand the bellows 52' and seat the valve 45' so that the relay then operates to increase the pressure gradually for opening the valve 5.

Although I have shown in Figs. 1 and 3 arrangements in which the valve 5 is moved toward its open position by an increase in the pressure supplied to the motor 4, it will be appreciated that the valve may cooperate with a seat at the opposite side of the port in the valve casing so that an increase in pressure tends to seat the valve. With such an arrangement the mechanism of Fig. 1 would operate to move the valve immediately from its closed position when the temperature changed to reverse the unbalance of the relay after the valve had been in its closed position for some time. With this arrangement in Fig. 3 the valve would be moved immediately from its full open position on a change in the condition to reverse the balance of the relay.

Figure 4:
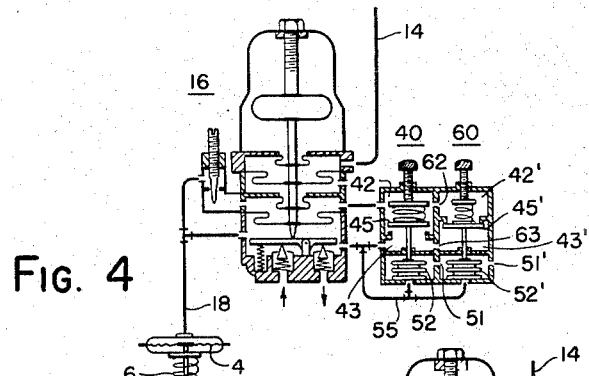
Figs. 3 and 4 are sectional views of other forms of the relay mechanism connected in a control system similar to that of Fig. 1.

There may be cases where it is desirable that the chambers 24 and 25 be connected in free communication when the pressure supplied to the motor 4 either increases or decreases beyond the limits at which the valve is fully opened or closed. In Fig. 4 I have shown the valve mechanisms 40 and 60 connected together at the side of the relay 16 for controlling communication between the relay chambers 24 and 25. The chambers 42, 43 of the valve mechanism 40 are connected to the relay chambers 24, 25 by the conduits 53, 54, respectively, and the chambers 42', 43' of the valve mechanism 60 are connected to the chambers 42, 43 through ports 62 and 63. The bellows 52 and 52' are connected to the relay chamber 25 through the conduit 55, and the chamber spaces surrounding the bellows are connected to the atmosphere through the ports 51 and 51'.

When the pressure in the relay chamber 25 is within the range for moving the valve 5 between its closed and open positions, the valves 45 and 45' are both closed. As soon as the pressure exceeds the value at which the valve 5 is fully opened, the valve 45 is unseated to connect the relay chambers 24, 25 in free communication. When the pressure drops below the value at which the valve 5 is seated, the valve 45' is opened to connect the relay chambers through the conduit 53, the chamber 42, the port 62, the chambers 42', 43', the port 63, the chamber 43 and the conduit 54. The operation of the valve mechanisms is the same as when used individually as shown in Figs. 1 and 3.

While there are shown in this application several forms which my invention may assume in practice, it will be understood that the invention may be modified and embodied in various other forms without departing from its spirit or the scope of the appended claims.

What I claim as new and desire to secure by Letters Patent of the United States is:

1. A relay mechanism including, in combination, a pressure chamber having a flexible wall, means providing a pair of pressure chambers separated by a common flexible wall, means connecting said flexible walls together for simultaneous movement, a restricted connection between said pair of chambers, a fluid supply and discharge connections for one of said pair of chambers, valve members for controlling said fluid supply and discharge connections, a member arranged for actuation by said wall connecting means and operative to control said valve members, passage means adapted to provide free communication between said pair of chambers, a valve mechanism for controlling communication through said passage means, said valve mechanism including a valve element cooperating with a valve seat, means for yieldingly urging said valve element in one direction relative to said seat, a pressure responsive device operatively connected to said valve element for moving the latter in the opposite direction relative to said seat, and means for subjecting said pressure responsive device to the pressure in one of said pair of chambers.

2. A relay mechanism including, in combination, a pressure chamber having a flexible wall, means providing a pair of pressure chambers separated by a common flexible wall, means connecting said flexible walls together for simultaneous movement, a restricted connection between said pair of chambers, fluid supply and discharge connections for one of said pair of chambers, valve members for controlling said fluid supply and discharge connections, a member arranged for actuation by said wall connecting means and operative to control said valve members, passage means adapted to provide free communication between said pair of chambers, a valve mechanism for controlling communication through said passage means, said valve mechanism including a valve element cooperating with a valve seat, means for yieldingly urging said valve element toward said seat, a pressure responsive device operatively connected to said valve element for unseating the latter on an increase in the pressure supplied thereto, and means for subjecting said pressure responsive device to the pressure in one of said pair of chambers.

3. The relay mechanism of claim 2 in which said last mentioned means subjects said pressure responsive device to the pressure in the one of said pair of chambers having fluid supply and discharge connections.

4. The relay mechanism of claim 2 including an adjustable abutment for said yielding means.

5. A relay mechanism including, in combination, a pressure chamber having a flexible wall, means providing a pair of pressure chambers separated by a common flexible wall, means connecting said flexible walls together for simultaneous movement, a restricted connection between said pair of chambers, fluid supply and discharge connections for one of said pair of chambers, valve members for controlling said fluid supply and discharge connections, a member arranged for actuation by said wall connecting means and operative to control said valve members, passage means adapted to provide free communication between said pair of chambers, a valve mechanism for controlling communication through said passage means, said valve mechanism including a valve element cooperating with a valve seat, means for yieldingly urging said valve element away from said seat, a pressure responsive device operatively connected to said valve element for seating the latter on an increase in the pressure supplied thereto, and means for subjecting said pressure responsive device to the pressure in one of said pair of chambers.

6. The relay mechanism of claim 5 including an adjustable abutment for said yielding means.

7. A relay mechanism including, in combination, a pressure chamber having a flexible wall, means providing a pair of pressure chambers separated by a common flexible wall, means connecting said flexible walls together for simultaneous movement, a restricted connection between said pair of chambers, fluid supply and discharge connections for one of said pair of chambers, valve members for controlling said fluid supply and discharge connections, a member arranged for actuation by said wall connecting means and operative to control said valve members, parallel passage means, each adapted to provide free communication between said pair of chambers, valve mechanisms for controlling communication through said parallel passage means, each of said valve mechanisms including a valve element cooperating with a valve seat, means for yieldingly urging one of said valve elements toward its seat, means for yieldingly urging the other of said valve elements away from its seat, pressure responsive devices operatively connected to said valve elements for urging the latter in opposition to their respective yielding means, and means for subjecting said pressure responsive devices to the pressure in one of said pair of chambers.

8. A valve mechanism for controlling communication between a pair of pressure chambers including, in combination, a pair of ports, each surrounded by a valve seat, means for connecting the space at one side of each of said ports in communication with one of said chambers, means for connecting the space at the other side of each of said seats in communication with the other of said chambers, valve members cooperating with said seats for controlling the flow of fluid through said ports, means for yieldingly urging one of said valve members toward its seat, means for yieldingly urging the other of said valve members away from its seat, pressure responsive devices for urging said valve members in opposition to said yielding means, and means for subjecting said pressure responsive devices to the pressure in one of said chambers.

9. The valve mechanism of claim 8 including separate adjustable abutments for each of said yielding means.

10. A relay mechanism operating in response to changes in a condition for establishing a pressure to regulate the supply of an agent determining the condition including, in combination, a pressure responsive element, means for connecting the spaces at opposite sides of said element in restricted communication, fluid supply and discharge passages connected to the space at one side of said element, valve members for controlling said passages, means controlled by said pressure responsive element for positioning said valve members, said last mentioned means operating on movement of said pressure responsive element in one direction from a neutral position to open said valve member controlling said supply passage and operating on movement in the opposite direction for opening said valve member controlling said discharge passage, means delivering pressure from the space to which the supply and discharge passages are connected for effecting a control of the agent, means for forcing said pressure responsive element in one direction or the other in response to changes in the condition, passage means adapted to connect the opposite sides of said pressure responsive element in free communication, a valve mechanism for controlling communication through said passage means, said valve mechanism including a valve element cooperating with a valve seat, means for yieldingly urging said valve element in one direction relative to said seat, a pressure responsive device for urging said valve element in the opposite direction relative to said valve seat, and means for subjecting said pressure responsive device to the pressure in the space at one side of said pressure responsive element.

11. The relay mechanism of claim 10 in which said last mentioned means subjects said pressure responsive device to the pressure in the space to which said supply and discharge passages are connected.

12. A relay mechanism operating in response to changes in a condition for establishing a pressure to regulate the supply of an agent determining the condition including, in combination, a pressure responsive element, means for connecting the spaces at opposite sides of said element in restricted communication, fluid supply and discharge passages connected to the space at one side of said element, valve members for controlling said passages, means controlled by said pressure responsive element for positioning said valve members, said last mentioned means operating on movement of said pressure responsive element in one direction from a neutral position to open said valve member controlling said supply passage and operating on movement in the opposite direction for opening said valve member controlling said discharge passage, means delivering pressure from the space to which the supply and discharge passages are connected for effecting a control of the agent, means for forcing said pressure responsive element in one direction or the other in response to changes in the condition, parallel passage means adapted to connect the opposite sides of said pressure responsive element in free communication, valve mechanisms for controlling communication through said parallel passage means, each of said valve mechanisms including a valve element cooperating with a valve seat, means for yieldingly urging one of said valve elements toward its seat, means for yieldingly urging the other of said valve elements away from its seat, pressure responsive devices for urging said valve elements in opposition to said yielding means, and means for subjecting said pressure responsive devices to the pressure in the space to which said supply and discharge passages are connected.

13. In a valving system for controlling communication between a pair of pressure chambers including, in combination, a restrictive means of communication between the two chambers, parallel passage means adapted to connect the chambers in free communication, valve mechanisms for controlling communication through said parallel passage means, each of said valve mechanisms including a valve element cooperating with a valve seat, means for yieldingly urging one of said valve elements toward its seat, means for yieldingly urging the other of said valve elements away from its seat, pressure responsive devices for urging said valve elements in opposition to said yielding means, and means for subjecting said pressure responsive devices to the pressure in one of said chambers.

References Cited in the file of this patent

UNITED STATES PATENTS

| | | |
|---|---|---|
| 993,921 | Walker | May 30, 1911 |
| 1,697,608 | Patterson | Jan. 1, 1929 |
| 1,767,702 | Ruckstuhl | June 24, 1930 |
| 1,849,702 | Bard | Mar. 15, 1932 |
| 1,906,652 | Spence | May 2, 1933 |
| 1,944,456 | Pearson | Jan. 23, 1934 |
| 2,039,587 | Emanueli | May 5, 1936 |
| 2,062,437 | Abbott | Dec. 1, 1936 |
| 2,146,092 | Raymond | Feb. 7, 1939 |
| 2,158,715 | Beekley | May 16, 1939 |
| 2,170,418 | Mabey | Aug. 22, 1939 |
| 2,517,051 | Swenson | Aug. 1, 1950 |

OTHER REFERENCES

Moore Products Co. (Phila., Pa.), Instructions 505–S for Nullmatic Controller Models 50 and 55, 1947–48, pages 2–7.